Jan. 3, 1961 A. HAHNEL 2,967,277

FREQUENCY DIVIDER

Filed July 29, 1958

*INVENTOR,*
ALWIN HAHNEL

*BY* Harry M. Saragovitz

ATTORNEY.

United States Patent Office 2,967,277

Patented Jan. 3, 1961

2,967,277

FREQUENCY DIVIDER

Alwin Hahnel, Rochester, N.Y., assignor to the United States of America as represented by the Secretary of the Army Filed July 29, 1958, Ser. No. 751,809

13 Claims. (Cl. 331—37)

(Granted under Title 35, U.S. Code (1952), sec. 266)

The invention described herein may be manufactured and used by or for the Government for governmental purposes, without the payment of any royalty thereon.

This invention relates to frequency divider circuits, and more particularly, to regenerative frequency divider circuits having variable division factors.

In my U.S. Patent No. 2,730,624, granted January 10, 1956, and in my U.S. Patent No. 2,816,227, granted December 10, 1957, I have disclosed "Periodically phase controlled oscillator" circuits, capable of reliably generating high order harmonic frequencies of a given fundamental, and of frequency multiplication by a ratio of several hundred to one. In my U.S. Patent No. 2,831,116, granted April 15, 1958, I have disclosed a frequency divider circuit utilizing such a periodically phase controlled oscillator, and capable of frequency division with ratios of similar order. Such frequency divider, while quite reliable, requires, as disclosed in Patent No. 2,831,116, a separate beat frequency detector circuit and a separate reactance tube modulator circuit in addition to the periodically phase controlled oscillator which is the heart of the circuit. However, simplification of circuits and reduction in number of the components therein, while maintaining a usable reliability, are always advantageous.

Accordingly, it is an object of the present invention to provide an improved frequency divider circuit wherein high frequency division ratios may be achieved with a minimum of circuitry.

It is further an object of the present invention to provide a frequency divider circuit incorporating a periodically phase controlled oscillator frequency multiplier circuit with a minimum of additional circuit components.

A still further object of the instant invention is to provide a frequency multiplier circuit of the periodically phase controlled oscillator type which is especially adapted for use in a frequency divider circuit with the minimum of additional circuit components.

It is another object of this invention to provide a frequency divider which is capable of providing a large number of different division factors with one relatively simple tuning adjustment.

In accordance with the present invention there is provided a frequency divider circuit for producing a desired subharmonic of a prescribed signal frequency. Included is a periodically phase controlled oscillator having means for generating a first high frequency oscillation of approximately the frequency to be divided, and a second subharmonic frequency oscillation cyclically interrupting the generation of the first and reinitiating it with a definite phase relation relative to the low frequency cycle, so as to enforce a selected harmonic relation between the frequencies of the high frequency and the low frequency oscillations. Additionally there is provided means for coupling the input signals of frequency to be divided into the periodically phase controlled oscillator in such a manner as to beat with the high frequency oscillations having the selected harmonic relation, and react on the low frequency oscillations to reduce the beat frequency difference to zero and to lock the selected harmonic signal in frequency synchronism with the input signal.

For a better understanding of the invention together with other and further objects thereof, reference is had to the following description taken in connection with the accompanying drawings, in which.

Figure 1:
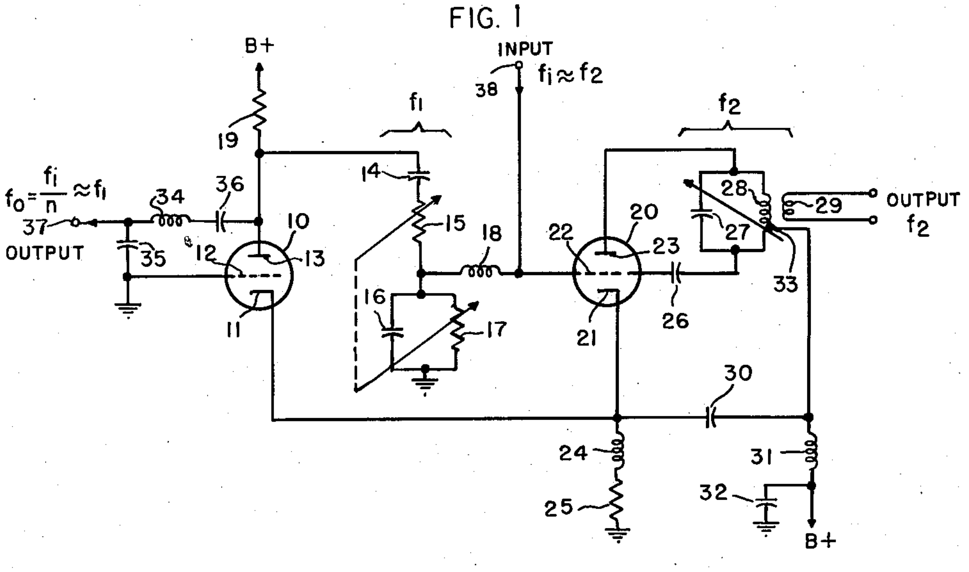
Fig. 1 shows a schematic diagram of a frequency divider in accordance with my invention.
Figure 2:
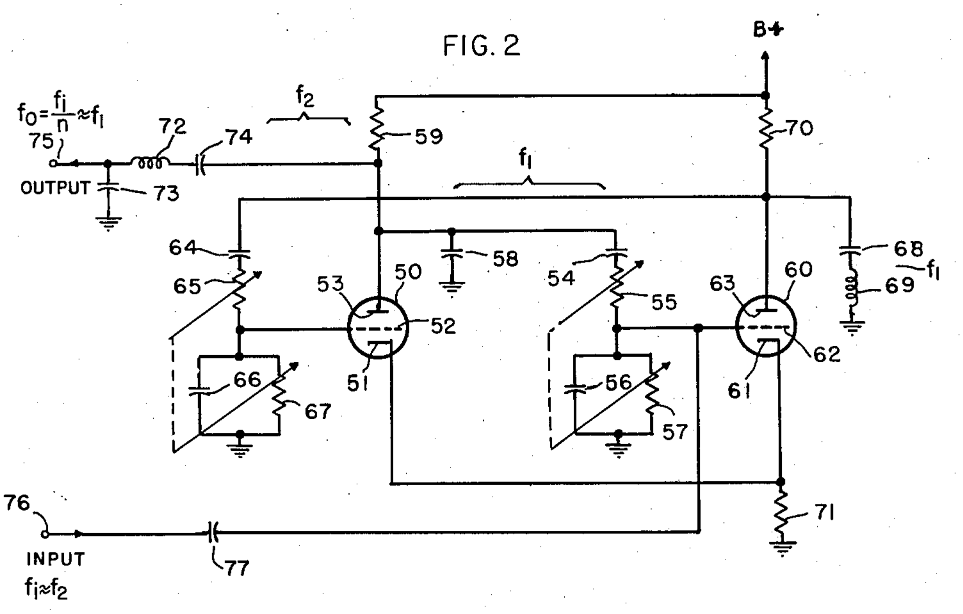
Fig. 2 shows a schematic diagram of another arrangement for a frequency divider, also embodying my invention.

In accordance with the present invention the frequency divider circuits of Fig. 1 and Fig. 2 each incorporates a periodically phase controlled oscillator operating in accordance with the principles described in my aforementioned U.S. Patents No. 2,730,624 and 2,816,227. As explained in these patents, whenever a higher frequency oscillation is periodically interrupted by one of lower frequency, and restarted at a time and with a phase determined by such lower frequency oscillation, the actual output is constrained in frequency to be a harmonic of the lower frequency.

The frequency divider arrangement, as illustrated in Fig. 1, includes high frequency oscillator circuit comprising the triode discharge amplifier tube 20, connected in a "Hartley" type circuit to the tunable parallel resonant circuit formed by capacitor 27 and inductor 28. That is, one terminal of 27 and 28 is connected directly to anode 23, the other is coupled through capacitor 26 to grid 22, while tap 33 intermediate the terminals of inductor 28 is coupled by way of capacitor 30 to cathode 21. Operating potential for the triode 20 may be supplied from the positive voltage supply terminal, indicated by the symbol "B+," through an isolating inductor 31 to the tap 33 and thence by way of the upper portion of winding 28 to the anode 23. The positive voltage source may be provided with a filter condenser 32.

A second triode discharge amplifier tube 10, cooperates with triode 20 to form a low frequency oscillator circuit, which circuit comprises a two-stage regenerative loop completed by a tunable frequency selective coupling 14, 15, 16, 17 from the anode of triode 10 to the grid 22 of triode 20 and a coupling between the cathodes 11 and 21 provided by the common cathode load 25. The grid 12 of triode 10 is grounded; anode 13 thereof is supplied operating voltage through anode load resistor 19. The frequency selective coupling for the low frequency may be similar to that employed in many "bridge" type oscillators and comprises the series resistor-capacitor circuit 14, 15 and shunt resistor-capacitor circuit 16, 17. Such circuit may be tuned either by the adjustment of the capacitors 14, 16 or of the resistors 15, 17. Isolation inductors 18 and 24 may be provided in the leads to the control grid 22 and the cathode 21 to reduce the shunting effect at the higher frequency of the low frequency circuit components connected to these electrodes. Inclusion of such inductances in the circuit is especially desirable where the ratio of the two frequencies is large.

The input signal whose frequency is to be divided, applied at terminal 38, is coupled to the grid 22 of triode 20, while desired frequency divided output is conveniently derived from the anode 13 by means of coupling capacitor 36 and applied to terminal 37 through low pass filter 34, 35. If amplified output at the higher frequency is also desired, such may be conveniently obtained by means of a secondary winding, as shown at 29, coupled to the inductor 28.

The operation of this circuit, in the absence of an input signal, is similar to that of the periodic phase controlled oscillators described in my aforementioned patents. The high frequency oscillator including triode 20 tends to oscillate at the frequency $f_2$ to which the circuit 27, 28 is tuned. However, at the same time, the low frequency oscillator circuit involving both of triodes 10, 20 oscillates at the frequency $f_1$, determined by coupling circuit 14, 15, 16 and 17. The effect of the low frequency oscillation voltages present on the electrodes of tube 20 is to interrupt the high frequency oscillation during the low frequency half cycle of one polarity and restart it in definite phase relationship relative to the low frequency cycle. Accordingly, as described in my aforementioned patents, the high frequency output is constrained to bear a definite harmonic relation in frequency to that of the low frequency. Thus varying the tuning of resonant circuit 27, 28 only varies the order of the harmonic produced or selected.

For such circuit to operate as a frequency divider some means must be provided to control the lower frequency $f_1$ to maintain the selected harmonic identical in frequency with that of the signal to be divided. In my previously mentioned U.S. Patent No. 2,831,116, there is disclosed for this purpose a beat frequency detector, responsive to a frequency difference between the selected harmonic and the input signals, whose output controls the tuning of the low frequency oscillator circuit. In the instant invention, it is discovered that adequate reliability can be obtained for many purposes without such separate reactance modulator means; that, by applying the input signal to be divided directly to the high frequency oscillator tube, the low frequency fundamental can be "pulled" in frequency to lock the selected harmonic to an identical frequency therewith. It is believed that the correct explanation of this phenomenon is as follows: Oscillations of the higher frequency $f_2$ beat at the grid 22 with the applied input signal $f_i$; the resulting beat difference signal then coacts with the low frequency oscillation signal $f_1$ also present on this grid 22 effecting a phase shift therein such as to reduce this beat frequency difference, and pull the harmonic into frequency lock with the input signal. However, irrespective of the exact mechanism of frequency locking, the circuit described in connection with Fig. 1 can be made to divide reliably in frequency to any desired integral sub-multiple up to a division ratio of more than 100 to 1, by adjusting the tuned circuit 27, 28 to approximately the frequency of the input signal and by adjusting the tuning of frequency selective coupling to a frequency substantially equal to the desired sub-multiple.

While the circuit in Fig. 1 is one which has been found suitable, it will be apparent from the above description that many variations and modifications of either the high frequency or low frequency oscillator circuits or both, are possible while still embodying the periodic phase control oscillator arrangement, and admitting of the frequency lock type synchronization described. This is illustrated by Fig. 2, which shows another arrangement embodying the instant invention, which arrangement is especially suitable where the input signal to be divided is of relatively low frequency within the range readily achievable by a resistance capacitance type tuning circuit.

In the circuit of Fig. 2, both the high frequency and the low frequency oscillators are similar two-stage regenerative loops, including the two triodes 50 and 60. Thus, similar to Fig. 1, the low frequency loop includes the coupling circuit 54, 55, 56, 57, tuned to $f_1$, connected between the anode 53 of triode 50 and the grid 62 of triode 60, and the common resistance 71 coupling cathode 61 to cathode 51; the high frequency loop includes the coupling circuit 64, 65, 66, 67, tuned to $f_2$, connected between anode 63 and grid 52, and is similarly completed by the common cathode resistor 71. Operating potential for tubes 50 and 60 is supplied from the positive power supply terminal through the anode loads 59 and 70 respectively. A series resonant circuit tuned approximately to $f_1$, comprising the capacitor 68 and inductor 69, connected between anode 63 and ground, and the bypass condenser 58 connecting anode 53 and ground, prevent the passage of the respective oscillations through the coupling circuit for the other frequency and thus limit them to the simple loops described. The input signal, whose frequency is to be divided, is applied at terminal 76 and coupled by means of capacitor 77 to grid 62. Output is derived from anode 53 by means of capacitor 74 and low pass filter 72, 73.

The manner of operation of Fig. 2 is similar to that of Fig. 1; low frequency oscillations are generated in the regenerative loop including coupling means 54, 55, 56, 57 while high frequency oscillations are generated in the loop including coupling means 64, 65, 66, 67 at such times as the low frequency oscillation voltages are appropriate, and are periodically interrupted by these voltages. The input signal of frequency $f_i$ pulls and locks the high frequency oscillations to its own frequency as in the circuit of Fig. 1.

While there has been described what are at present considered to be the preferred embodiments of this invention, it will be obvious to those skilled in the art that various changes and modifications may be made therein without departing from the invention, and it is therefore intended, by appended claims, to cover all such changes and modifications as fall within the true spirit of the invention.

What is claimed is:

1. An oscillator and harmonic generator circuit comprising first and second amplifier stages, each said stage having an output circuit and an input circuit coupled to the output circuit of the other said stage, to form a two-stage regenerative oscillating loop, one of said interstage couplings comprising a frequency selective filter tuned to a desired fundamental frequency, whereby said two stages oscillate at said fundamental frequency, and frequency selective means tunable to a harmonic of said fundamental frequency coupling the output circuit of one of said stages regeneratively to its input circuit thereby completing a second oscillation circuit oscillating at said harmonic frequency.

2. A harmonic generator for generating an output signal whose frequency is a selectable harmonic of a given fundamental frequency comprising first and second electron discharge amplifier devices, each having input and output circuits, frequency selective circuit means tuned to said fundamental frequency coupling the output circuit of said first device to the input circuit of said second device, said devices and circuit means forming a regenerative loop of sufficient gain to oscillate continuously and broad band circuit means coupling the output circuit of said second device to the input circuit of said first device, thereby forming a two-stage oscillator at said fundamental frequency, and frequency selective means tuned to said harmonic frequency regeneratively coupling the output circuit of said second device to its input circuit thereby completing a second oscillation circuit oscillating at said harmonic frequency.

3. A harmonic generator for generating an output signal whose frequency is a selectable harmonic of a given fundamental frequency, comprising first and second electron discharge amplifier tubes, each having a cathode, an anode and a control grid, a cathode load connected in common to the cathode-anode and cathode-control grid circuits of both said tubes, means for coupling signals of frequency equal to said fundamental frequency from the anode of said first tube to the control grid of said second tube, completing with said common cathode load a two-stage regenerative loop of sufficient gain to oscillate continuously and at said fundamental frequency, and second tunable means including said common cathode load for regeneratively coupling signals of frequency equal to said harmonic frequency from the anode circuit to cathode-control grid circuit of said second tube, thereby forming a second oscillation circuit oscillating at said harmonic frequency.

4. A harmonic generator as recited in claim 3, wherein said first means for coupling comprises an anode load for said first tube, a series resistor-capacitor combination serially connected between the anode of said first tube and the control grid of said second tube, and a parallel resistor-capacitor combination connected in shunt to the signal coupling path.

5. A harmonic generator as recited in claim 4, wherein said second means for coupling includes a parallel resonant inductor-capacitor circuit coupled between the anode and control-grid of said second tube, and tap means connected to said inductor intermediate the terminals thereof, coupled to the cathode of said second tube.

6. A harmonic generator as recited in claim 4, wherein said second means for coupling includes an anode load for said second tube, a second series resistor-capacitor combination serially connected between the anode of said second tube and the control grid of said first tube, and a second parallel resistor-capacitor combination connected in shunt to the signal coupling path.

7. A frequency divider circuit responsive to an input signal of a given frequency to generate an output signal of subharmonic frequency comprising first and second electron discharge amplifier devices, each having input and output circuits, frequency selective circuit means approximately tuned to said given frequency for coupling the output circuit of said first device to the input circuit of said second device, broad band circuit means coupling the output circuit of said second device to the input circuit of said first device, said devices and circuit means forming a two-stage oscillator oscillating at approximately said subharmonic frequency, frequency selective means tuned approximately to said harmonic frequency regeneratively coupling the output circuit of said second device to its input circuit and completing a second oscillator circuit oscillating at approximately said given frequency, means applying said input signal to the input circuit of said second device to beat said input signal against said oscillations of subharmonic frequency, thereby producing a difference beat frequency signal to react with the oscillations of subharmonic frequency and thereby lock both said oscillations with said input signals, and means for deriving said signal oscillations of subharmonic frequency from the output of said first device as an output signal.

8. A frequency divider circuit responsive to an input signal of a given frequency to generate an output signal of subharmonic frequency comprising first and second electron discharge amplifier tubes, each having a cathode, an anode and a control grid, a cathode load connected in common to the cathode-anode and cathode-control grid circuits of both said tubes, first means coupling signals of approximately said subharmonic frequency from the anode of said first tube to the control grid of said second tube and completing with said common cathode load a two-stage regenerative loop of sufficient gain to oscillate continuously and at approximately said subharmonic frequency, second means including said common cathode load for regeneratively coupling signals of approximately the given frequency from the anode circuit to the cathode control grid circuit of said second tube and forming a second oscillation circuit oscillating at said given frequency, means for applying said input signal to said control grid-cathode circuit of said second tube to beat said input signal against said oscillations of approximately given frequency to thereby produce a difference beat frequency to react with the oscillations of subharmonic frequency and thereby lock said oscillations in frequency with said input signals, and means for deriving said oscillations of subharmonic frequency as an output signal.

9. A frequency divider circuit as recited in claim 8, wherein said first means for coupling comprises an anode load for said first tube, a series resistor-capacitor combination serially connected between the anode of said first tube and the control grid of said second tube, and a parallel resistor-capacitor combination connected in shunt to the signal coupling path.

10. A frequency divider circuit as recited in claim 9, wherein said second means for coupling includes a parallel resonant inductor-capacitor circuit coupled between the anode and control grid of said second tube, and tap means connected to said inductor intermediate the terminals thereof coupled to the cathode of said second tube.

11. A frequency divider circuit as recited in claim 9, wherein said second means for coupling includes an anode load for said second tube, a second series resistor-capacitor combination serially connected between the anode of said second tube and the control grid of said first tube, and a second parallel resistor-capacitor combination connected in shunt to the signal coupling path.

12. A frequency divider circuit responsive to an input signal of a given frequency to generate an output signal of subharmonic frequency comprising an oscillator circuit tuned to generate oscillations of approximately said given frequency, said oscillator including a first electron discharge amplifier tube having an anode, a cathode and a control grid and a regenerative feed back loop; a further oscillating feedback circuit tuned approximately to said subharmonic frequency comprising said first amplifier tube, a second electron discharge amplifier tube having an anode, a cathode and a control grid, means for coupling signals of subharmonic frequency between said cathodes comprising a cathode load impedance means common to the cathode-anode and cathode-control grid circuits of both said amplifier tubes, and frequency selective means for coupling signals of approximately said subharmonic frequency from the anode of said second amplifier tube to the cathode control grid circuit of said first amplifier tube; and coupling means applying said input signals to the cathode-control grid circuit of said first amplifier tube.

13. A frequency divider circuit as recited in claim 12, wherein said frequency selective coupling means comprises an anode load for said second amplifier tube, a series resistor-capacitor combination serially connected between the anode of said second amplifier tube and the control grid of said first amplifier tube, and a parallel resistor-capacitor combination connected in shunt to the signal coupling path.

References Cited in the file of this patent

UNITED STATES PATENTS 2,496,994 Goldberg ............. Feb. 7, 1950